United States Patent

Greil

[15] 3,647,506
[45] Mar. 7, 1972

[54] METHOD OF AND APPARATUS FOR BURNING GRADUATIONS SYMBOLS AND LETTERING INTO GLASS ARTICLES

[72] Inventor: Erich Greil, Wertheim, Germany

[73] Assignee: Forschungsgemeinschaft fur technisches Glas e.V., Wertheim, Germany

[22] Filed: July 12, 1968

[21] Appl. No.: 744,466

[30] Foreign Application Priority Data

July 14, 1967 Germany ...................... P 15 96 803.3

[52] U.S. Cl. .......................... 117/37 R, 117/93.3, 117/124 A, 65/60
[51] Int. Cl. ..................................... C03c 17/22, C03c 17/26
[58] Field of Search .............. 117/37, 93.3, 124 A, 160, 62.2; 65/36, 60

[56] References Cited

UNITED STATES PATENTS

| | | | |
|---|---|---|---|
| 3,330,682 | 7/1967 | Tamura | 117/93.3 |
| 2,962,383 | 10/1960 | Franci et al. | 117/37 |
| 2,825,634 | 3/1958 | Rindone | 117/93.3 |
| 2,707,688 | 5/1955 | Blackman | 117/37 |
| 914,734 | 3/1909 | Kyle | 161/116 |
| 3,489,588 | 1/1970 | Mansur et al. | 117/93.3 |
| 2,715,363 | 8/1955 | Hoover | 101/426 |

OTHER PUBLICATIONS

Hall, J. D. Industrial Applications of Infrared, New York, McGraw-Hill Book Co. Inc., 1947. p. 76–77

*Primary Examiner*—Alfred L. Leavitt
*Assistant Examiner*—M. F. Esposito
*Attorney*—Markva & Smith

[57] ABSTRACT

The invention provides a method of and apparatus for burning graduations, symbols and lettering into glass articles by using a glass substrate and a marking enamel or stain which have different absorptions for light and radiant heat in such a way that firing by radiation heating between $400 \times 10^{-9}$ m. and $2,500 \times 10^{-9}$ m. raises the temperature of the colored areas on the glass above that of the glass substrate itself by about 150° C.

7 Claims, 1 Drawing Figure

PATENTED MAR 7 1972  3,647,506
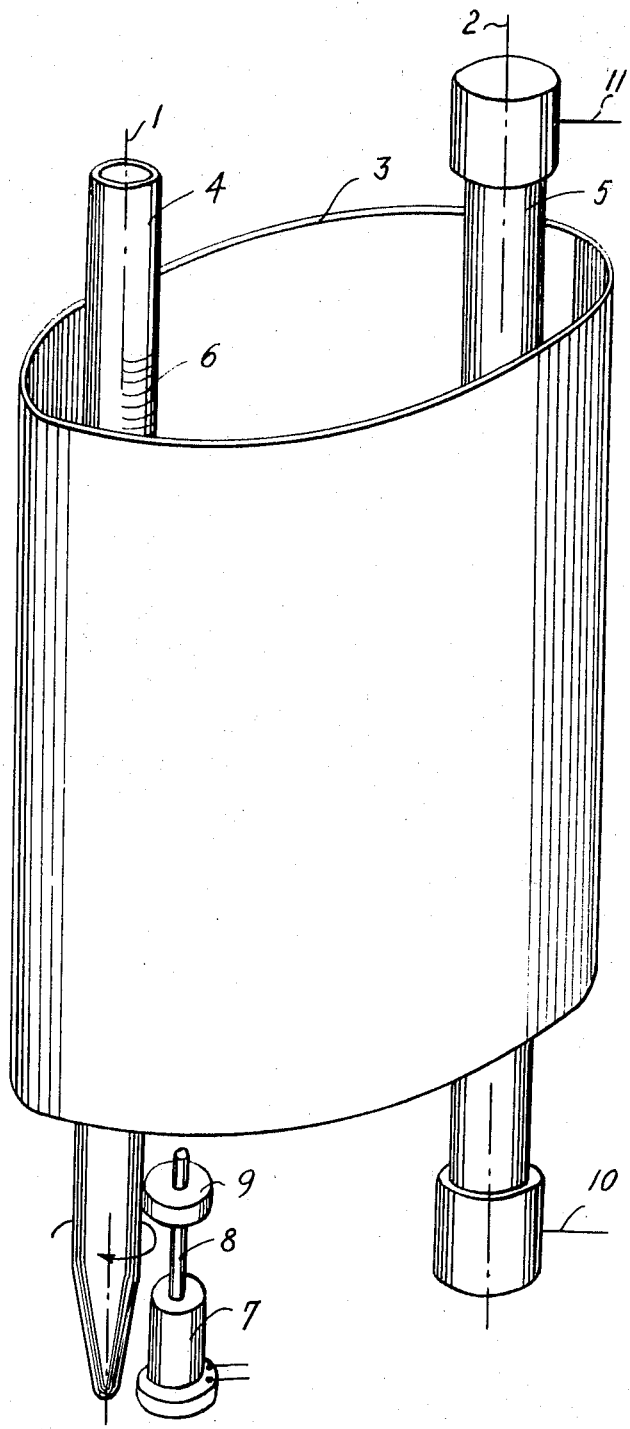
INVENTOR:
ERICH GREIL
BY
ATTORNEYS

METHOD OF AND APPARATUS FOR BURNING GRADUATIONS SYMBOLS AND LETTERING INTO GLASS ARTICLES

BACKGROUND OF THE INVENTION

Known processes of providing glass apparatus with graduations, symbols and lettering comprise either etching or cutting them into the glass, fusing enamels onto their surface or introducing stains or diffusion pigments into the layer of glass immediately beneath the surface. Enamels are frequently also fused into etched score lines, for instance in glass mensuration vessels and thermometers.

For burning these enamels into the glass the latter must be carefully adjusted after the graduations have been applied and then heated to the fusion temperature of the enamels or to the diffusion temperature of the stain while taking care that the glass substrate itself is not deformed. The optimum firing temperatures of chemically sufficiently resistant coloring materials now available are above the transformation temperature of the majority of glasses used for measuring instruments. Hitherto the firing temperatures therefore had to be strictly limited and the maximum possible chemical resistance of the enamel as well as the optimum depth of penetration for maximum durability and color saturation of the stain could not be achieved.

SUMMARY OF THE INVENTION

In order to overcome these shortcomings the present invention proposes to burn graduations, symbols and lettering into glass articles by using a glass substrate and a marking enamel or stain which have different absorptions for light and radiant heat in such a way that firing by radiation heating between $400 \times 10^{-9}$m. and $2,500 \times 10^{-9}$m. raises the temperature of the colored areas on the glass above that of the glass substrate itself by about 150° C.

The glass substrate and the marking enamel or stain are so chosen that they differentially absorb the light and the radiant heat to which they are exposed, so that their heating rates and the temperatures achieved in the radiant field are different. For this purpose suitable radiation sources are halogen lamps and infrared radiators.

The glasses to which the graduations, symbols and lettering are to be applied should preferably be colorless, clear types of glass which absorb less than 10 percent at wavelengths between 0.4 and $2 \times 10^{-6}$m. and transmit the wavelengths of 0.6 to $2.6 \times 10^{-6}$m. used for radiation heating with practically no absorption.

If diffusing stains are to be burnt into the glass it is preferred that the glass should contain a little antimony and aluminum and that it should be substantially free from arsenic and zinc.

The fusion pigments are readily melting transparently colored enamels which may consist of finely ground quartz sand, lead oxide and borax and which according to the desired coloration may contain tin dioxide, titanium dioxide, cadmium sulphide, cobalt oxide, manganese oxide or iron oxide. Such a mixture is rubbed down to a paste with oil of turpentine and painted on the glass.

Stains in the case of which the coloring constituents diffuse into the glass substrate by exchange reactions, particularly with the sodium in the glass substrate, may be for instance mixtures of silver sulphide, silver sulphate, copper oxide and iron oxide powders rubbed into extenders and binders to form adhering stains.

Experience has shown that the colored regions on normal types of glass can be heated to temperatures exceeding that of the glass substrate by about 150° C. This permits optimum firing temperatures to be achieved without deformation of the glass by softening and without affecting the calibration of glass mensuration vessels.

For concentrating a sufficiently high radiation density on the object, preferably in the wavelength region between 1 and $2 \times 10^{-6}$m., reflectors of suitable shape and size can be employed, consisting for instance of polished light metal.

DESCRIPTION OF THE PREFERRED EMBODIMENT

The drawing illustrates apparatus which permits the method according to the invention to be performed.

Such apparatus for high-temperature firing of graduations 6 and letterings on pipettes 4 and rod thermometers may comprise an elliptic cylinder reflector 3, a pipette 4 representing the work being located in one focal axis 1 and a tubular lamp 5 as the radiator in the other local axis 2.

The pipette 4 is rotated by a friction wheel 9 driven by a motor 7 through a shaft 8. The tubular lamp 5 has terminal connectors 10 and 11.

While the method of and apparatus for burning graduations symbolts and lettering into glass articles has been shown and described in detail, it is obvious that this invention is not to be considered as being limited to the exact form disclosed, and that changes in detail and construction may be made therein within the scope of the invention, without departing from the spirit thereof.

What is claimed is:

1. A method of burning markings such as graduations, symbols and lettering into a glass substrate comprising the steps of:
   a. providing a colorless and clear glass substrate which absorbs less than 10 percent of wavelengths between 0.4 and $2 \times 10^{-6}$ mm and transmits wavelengths of 0.6 to $2.6 \times 10^{-6}$ mm with practically no absorption,
   b. providing a material having an absorption for light and radiant energy which is relatively high compared to that of the glass substrate,
   c. applying a coating of said material directly to selected areas on the glass substrate for marking said glass
   d. directing infrared rays in a range of from 0.4 microns to 2.5 microns onto the marked glass substrate whereby said coating absorbs the radiant energy to which it is subjected while a minimal amount of radiant energy is absorbed in the uncoated areas of the glass substrate to heat the marked areas to an amount greater than the temperature of the glass substrate,
   e. said greater amount being sufficient to cause the burning of said material into the glass substrate without deforming said glass substrate.

2. A method as defined in claim 1 wherein said glass contains antimony and aluminum and is substantially free from arsenic and zinc.

3. A method as defined in claim 1 wherein said greater amount is about 150° C. higher than the temperature of the glass substrate.

4. A method as defined in claim 1 wherein the radiating step includes directing the rays of at least one halogen lamp onto said marked substrate to effect the burning of the material into the glass substrate.

5. A method as defined in claim 1 wherein said marking material contains fusion colors consisting of finely ground quartz sand, lead oxide and borax, mixed with tin oxide, titanium dioxide, cadmium sulfide, cobalt oxide, manganese or iron oxide according to the desired coloration, and the marking material applying step includes mixing fusion colors and turpentine oil to form a paste.

6. A method as defined in claim 1 wherein the marking material contains stains consisting of silver sulphite and silver sulphate.

7. A method as defined in claim 1 wherein the marking material contains stains consisting of copper oxide and copper sulphate.

\* \* \* \* \*